UNITED STATES PATENT OFFICE.

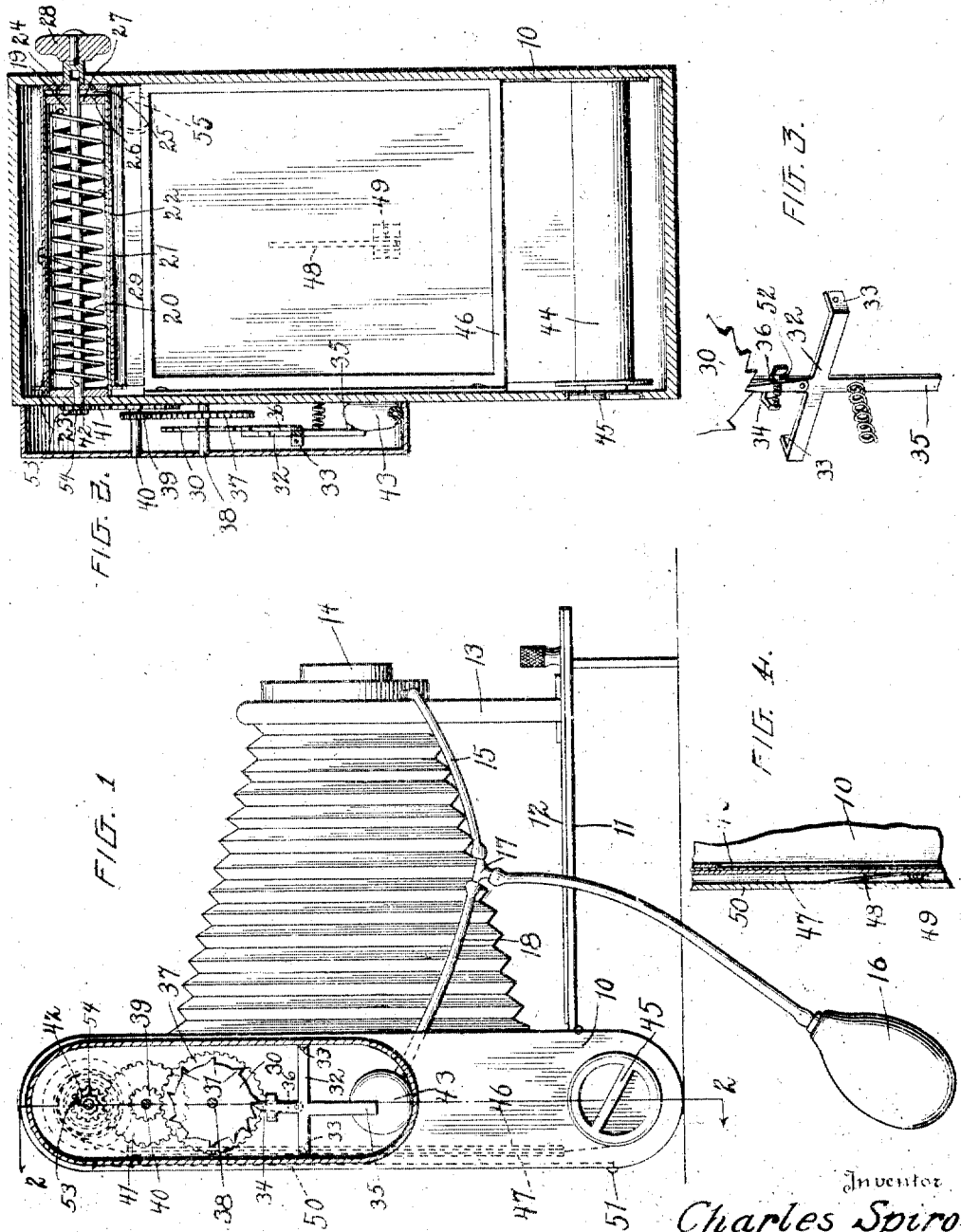

CHARLES SPIRO, OF NEW YORK, N. Y.

AUTOMATIC FILM-FEED.

1,235,073.     Specification of Letters Patent.     Patented July 31, 1917.

Application filed February 29, 1916. Serial No. 81,149.

*To all whom it may concern:*

Be it known that I, CHARLES SPIRO, a citizen of the United States, residing at New York, in the county of New York and State of New York, have invented certain new and useful Improvements in Automatic Film-Feeds, of which the following is a specification.

This invention relates to an automatic film feed for photographic cameras and particularly to a construction wherein the feed of the film is automatically controlled by the means used to operate the lens shutter and subsequent to the operation thereof.

The invention has for an object to present a novel and improved construction by which the shutter is operated and the film actuating roll or drum released through a pressure device having a single hand bulb and independent connections adapted for application to an ordinary lens shutter and film.

A further object is to provide an improved escapement mechanism comprising a wheel having teeth at varying intervals whereby each negative on a film is, through the coöperation of a dog device, accurately separated from the adjacent one, notwithstanding the increased diameter of the roll of film after a number of exposures have been made.

Another object of the invention is to provide a novel arrangement of shell carrying the film and adapted for connection and disconnection with a spring actuated winding roll or drum which saves loss of time, lost motion and inaccurate setting of the film for the first exposure, while permitting the automatic rewinding of the spring when the exposed film is rewound upon its original spool.

Other and further objects and advantages of the invention will be hereinafter set forth and the novel features thereof defined by the appended claims.

In the drawing—

Figure 1 is an elevation, with a portion of the device shown in section;

Fig. 2 is a vertical section on the line 2—2 of Fig. 1;

Fig. 3 is a detail rear perspective of the escapement dogs, and

Fig. 4 is a detail vertical section at the center of the film holding frame.

Like numerals refer to like parts in the several figures of the drawing.

The numeral 10 designates the camera casing which may be of any desired material or configuration and is provided with the front panel 11 having the slide ways 12 upon which the standard 13 carrying the lens and its shutter 14 are adapted to be moved when the camera is opened for use. This lens shutter may be of any preferred construction and is shown as operated by the air or fluid pressure tube or connection 15 extending from the actuating hand bulb 16. The tube is connected with the bulb by a three-way coupling 17 from which an independent tube 18 extends to the film operating means.

These means comprise a winding roll or drum 19 operated by a tension spring 20 secured at one end to the shaft 21 and at its opposite end to the drum. A desirable means for connecting the film to this drum comprises a shell or tube 22 open at one end 23 so as to slide over the drum, and having its opposite end 24 provided with interlocking projections 25 adapted to enter coöperating recesses 26 in the head of the drum 19. These parts may be pushed or moved into locking contact by the handle or knob 28 carried by the end 24 of the shell 22. This knob also permits the shell to be turned independently of the drum when the projections are separated from the recesses for the purpose of setting the film in proper position for the first exposure, or otherwise shifting the film at any time independent of the escapement mechanism. The free end of the film is connected to the shell in the usual manner, for instance, by the hook 29.

The intermittent feed or rotation of the winding drum 19 to bring the different sections of the film into proper position for exposure is controlled by a suitable escapement mechanism. A preferred form thereof comprises an escapement wheel 30 having a series of teeth 31 upon the periphery thereof properly spaced at varying distances apart to permit different extents of travel of the film relative to the diameter of its winding drum which progressively increases through the collection of a greater body or bulk of film thereon. This wheel is controlled by a dog device 32 pivotally mounted at 33 to oscillate transversely to the path of travel of the wheel 30. The form of dog herein shown embodies a solid toothed member 34 having an actuating tail 35 extended beyond the pivot 33. The member 34 has pivoted thereon the spring held movable dog member 36 adapted to engage a stop lug 52. Other forms of dog may be used and the members are arranged to alternately engage the teeth of the escapement wheel in the usual manner.

The wheel 30 is connected with the winding drum in any desired manner, for instance, by the reducing gearing shown which effects a relatively greater number of revolutions of the drum for each revolution of the escapement wheel. The shaft 21 of the drum is provided with a loosely mounted pinion 42 which carries a pawl 53 engaging a ratchet 54 secured to the shaft 21. The pinion 42 meshes with a gear 41 upon the stub shaft 40 which also carries a pinion 39 meshing with a gear 37 on the shaft 38 of the escapement wheel. This pawl and ratchet connection from the winding drum shaft permits the rewinding of the spring thereof without reversing or affecting the tension of the reducing gears, as shown in Fig. 2. The tail 35 of the dog device is actuated by an inflatable bulb 43, or other suitable pressure operated device, carried by the tube 18 from the hand bulb 16. At the opposite end of the casing from the winding drum the usual film spool 44 is pivotally mounted and adapted to be rotated manually for rewinding the film thereon by the key 45 of ordinary construction. This operation also rewinds the spring of the winding drum as the escapement construction permits such reversal of movement.

For the purpose of holding the film flat in proper position for exposure a frame has been provided composed of a fixed plate 46 and a coöperating plate 47 held in yielding contact therewith by a spring 48 pivoted thereto at 49 and bearing against the rear panel or door 50 of the casing. This door is pivoted at 51 to permit access to the camera for inserting or removing the film or other purpose. The rear of the camera is also provided with the usual glazed sight opening 55 through which the position of the film may be seen to properly adjust its connection with the winding drum for the first exposure.

In the operation of the invention the film spool is inserted in the camera casing in the usual manner and the free end of the film connected with the shell upon the winding drum the spring of which is under tension. The shell is then adjusted independently of the drum to bring the film in proper position for the first exposure. These parts are then connected together as described and held against rotation by the spring dog device engaging the escapement wheel and also being swung into contact with the stop lug at one side. When the hand bulb is compressed the shutter is operated and the solid dog oscillated through pressure upon the tail thereof into engagement with the wheel during exposure. When the shutter is closed and the hand bulb relaxed the return movement of the dog device permits the travel of the escapement wheel for the distance between adjacent teeth thus winding the film sufficient to bring it in position for the next exposure. The spacing of the teeth at varied intervals provides for the equal travel of the film as the bulk thereof collects upon the winding drum and the diameter upon which the film is wound increases. After all exposures have been completed the film may be rewound upon the original spool which is then removed for developing and a new spool inserted. This rewinding action restores the tension of the spring of the winding drum and this reverse movement is permitted by the escapement mechanism which is held against its normal winding action by the spring dog. The drum shaft is permitted to reverse its normal rotation by the pawl and ratchet connection with the loose pinion thereon to rewind its spring when the film is rewound upon its spool. The film guiding frame holds the film evenly in flat position for exposure and the yielding member thereof equalizes the pressure at all points of contact.

It will be seen that the invention is capable of application to any ordinary construction of camera without materially altering the parts thereof and no special structure of shutter or film is required. The single hand bulb having independent tubes to the shutter and film releasing mechanism is an important practical and commercial advantage as it requires no change in the shutter and permits the use of the ordinary film thus effecting the conversion of the usual camera into one having mechanism for automatically and progressively feeding the film. This feeding through the varied spacing of the teeth upon the escapement wheel insures each negative in a roll of film being evenly spaced from an adjacent one, notwithstanding the increasing diameter of the roll of film as successive exposures are made. The arrangement of the shell for connection and disconnection with the winding drum provides for a proper adjustment for the first exposure thus saving time, lost motion and inaccurate setting of the film. It will also be noted that the action of rewinding the film upon its original spool restores the tension of the spring of the winding drum ready for operation with the next roll of film.

Detail constructions of a number of the parts herein have been shown and described but it will be seen from the following claims that the invention is not specifically confined thereto as changes may be made as found desirable or convenient.

What I claim is:—

1. In an automatic film feed, a film winding roll provided with automatic winding means, an escapement mechanism constructed to control the extent of travel of said means relative to the body of film wound thereon, means for rewinding the film from said roll to thereby place the winding means under tension without affecting the position of said escapement mechanism, and means to release said escapement mechanism for a step movement thereof.

2. In an automatic film feed, a film winding roll provided with automatic winding means, an escapement wheel connected thereto to control the rotation thereof and having teeth spaced at varying intervals, an oscillating dog device coöperating with the teeth of said escapement wheel, and pressure means mounted to engage an extended end from said dog device to actuate the same.

3. In an automatic film feed, a film winding roll provided with actuating means, an escapement wheel constructed to control the travel of said roll for predetermined irregular intervals, an oscillating dog engaging the teeth of said wheel and having an operating extension, and a hand bulb having pressure operated means to engage and actuate said extension.

4. In an automatic film feed, a film winding roll provided with actuating means, an escapement wheel connected thereto and having teeth spaced at varying intervals, a geared connection from said wheel to said roll actuating means, an oscillating dog engaging the teeth of said wheel and having an operating extension, a bulb disposed to actuate said extension, and a hand bulb having a tube connection with said first mentioned bulb.

5. In an automatic film feed, a film winding drum provided with automatic winding means, means for controlling the movement of said drum, a film holding shell rotatable upon said drum, means for rotating said shell independent of the drum, and means for connecting said shell and drum for joint rotation.

6. In an automatic film feed, a film winding drum provided with automatic winding means, means for controlling the movement of said drum, a film holding shell slidable and rotatable upon said drum, means for rotating said shell independent of the drum, and interlocking means for connecting said shell and drum for joint rotation by the sliding movement.

7. In an automatic film feed, a headed film winding drum provided with actuating means, means for controlling the movement of said drum, a film holding shell slidable and rotatable upon said drum, interlocking projections and recesses in the heads of said shell and drum, and an operating handle extended from one end of said shell.

8. In an automatic film feed, a film winding drum, a shaft therefor, an actuating spring connected to said shaft and drum, a pinion upon said shaft, an escapement wheel provided with teeth at irregularly spaced intervals thereon and with a gear upon its shaft, coöperating gearing between said gear and pinion, and a dog device for controlling said escapement wheel.

9. In an automatic film feed, a film winding drum, a shaft therefor, an actuating spring connected to said shaft and drum, a pinion upon said shaft, an escapement wheel provided with a gear upon its shaft, coöperating gearing between said gear and pinion, a dog device for controlling said escapement wheel, a film holding shell slidably and rotatably mounted upon said drum, and interlocking means for connecting said shell and drum for joint rotation.

10. In an automatic film feed, a film winding drum, a tension spring for rotating said drum in one direction, an escapement mechanism for controlling the travel of said drum, and arranged to permit rewinding of said spring, and a film spool connected by its film with said drum and adapted to effect a rewinding of said spring as the film is rewound upon the spool after exposure.

11. In an automatic film feed, the combination of a camera casing, a spring actuated film winding drum at one end thereof, a film spool rotatably mounted at the opposite end thereof, film guiding means disposed intermediate said drum and spool and constructed to exert retarding and frictional pressure upon the film, and means for controlling the automatic rotation of said winding drum for predetermined irregular intervals of travel relative to the body of film wound thereon.

12. In an automatic film feed, a spring actuated film winding drum, an escapement wheel arranged to control said drum for successively decreasing extents of travel, a dog device for controlling said wheel, bulb operated means for actuating said dog device, and means to effect a rewinding of the spring of said drum as the film is removed therefrom.

13. In an automatic film feed, a film winding roll provided with an automatic winding spring, an escapement mechanism connected to control said spring, means to release said escapement, and means for rewinding the film from said roll onto its original spool and thereby restoring the tension of said winding spring.

14. In an automatic film feed, a film winding roll provided with automatic winding means, an escapement mechanism connected to control said means, means to release said escapement, and means for rewinding the film from said roll and thereby placing the automatic winding means under tension.

15. In an automatic film feed, a film winding drum provided with automatic winding means, means for controlling the movement of said drum, a film receiving member carried by said drum, means for manually rotating said member independent of the drum, and means for connecting said drum and member for automatic joint rotation.

In testimony whereof I affix my signature in the presence of two witnesses.

CHARLES SPIRO.

Witnesses:
E. F. TIEDEMAN,
STEPHEN F. CURTIS.